United States Patent
Satran et al.

(10) Patent No.: US 6,684,752 B2
(45) Date of Patent: Feb. 3, 2004

(54) MILLING CUTTER AND CUTTING INSERT THEREFOR

(75) Inventors: Amir Satran, Kfar Vradim (IL); Daniel Ulianitsky, Maalot-Tarshiha (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 10/184,990

(22) Filed: Jul. 1, 2002

(65) Prior Publication Data

US 2003/0005803 A1 Jan. 9, 2003

(30) Foreign Application Priority Data

Jul. 4, 2001 (IL) .................................................. 144138

(51) Int. Cl.[7] .............................................. B23P 15/28
(52) U.S. Cl. ............................ 83/835; 407/14; 407/114
(58) Field of Search ............................ 407/42, 58, 61, 407/113, 114, 115, 116; 83/663, 835, 836, 839, 840, 841, 842, 843, 844, 853, 855

(56) References Cited

U.S. PATENT DOCUMENTS

| | | | | |
|---|---|---|---|---|
| 5,052,863 A | * | 10/1991 | Satran | 407/113 |
| 5,116,167 A | * | 5/1992 | Niebauer | 407/114 |
| 5,207,538 A | * | 5/1993 | Satran | 407/113 |
| 5,230,591 A | * | 7/1993 | Katbi et al. | 407/114 |
| 5,383,750 A | * | 1/1995 | Satran et al. | 407/113 |
| 5,685,670 A | * | 11/1997 | Satran | 407/42 |
| 5,797,707 A | * | 8/1998 | Stallwitz et al. | 407/114 |
| 5,803,674 A | * | 9/1998 | Satran et al. | 407/42 |
| 5,807,031 A | * | 9/1998 | Arai et al. | 407/113 |
| 5,947,650 A | * | 9/1999 | Satran et al. | 407/113 |
| 6,050,752 A | * | 4/2000 | DeRoche | 407/114 |
| 6,062,775 A | * | 5/2000 | Satran et al. | 407/46 |
| D426,839 S | * | 6/2000 | Morrison et al. | D15/139 |
| 6,142,716 A | * | 11/2000 | Jordberg et al. | 407/114 |
| 6,374,712 B1 | * | 4/2002 | Muller et al. | 82/1.11 |
| 6,431,799 B1 | * | 8/2002 | Francis et al. | 407/42 |

FOREIGN PATENT DOCUMENTS

| | | |
|---|---|---|
| JP | 11-138325 A | 5/1999 |
| JP | 11-197935 A | 7/1999 |
| JP | 2000-52131 | 2/2000 |
| WO | WO 99/12686 | 3/1999 |
| WO | WO 00/76707 | 12/2000 |

* cited by examiner

Primary Examiner—Allan N. Shoap
Assistant Examiner—Ghassem Alie
(74) Attorney, Agent, or Firm—Womble, Carlyle

(57) ABSTRACT

An indexable cutting insert for use in a milling cutter. The cutting insert having four identical side surfaces extending between generally square shaped top and bottom surfaces with two diametrically opposite protuberances extending away from each other in a top or bottom view of the cutting insert. The cutting insert has eight identical major and minor cutting edges. The milling cutter having the general form of a circular disk with a plurality of the cutting inserts releasably mounted in insert pockets angularly around the periphery of the cutter. The cutting inserts are arranged to produce a profile on a workpiece having a central straight section and two beveled sections on either side of the central straight section.

15 Claims, 5 Drawing Sheets

MILLING CUTTER AND CUTTING INSERT THEREFOR

FIELD OF THE INVENTION

The present invention relates to a milling cutter and a cutting insert for machining metal workpieces in general and the cams of camshafts in particular.

BACKGROUND OF THE INVENTION

A milling cutter of this type is disclosed in JP 2000052131. The milling cutter disclosed in this publication comprises groups of two tangentially oriented cutting inserts arranged in pairs a circumferentially staggered formation. The two inserts of a given pair overlap at least partially when superimposed. As shown in FIG. 8 of this publication the milling cutter is only suitable for machining the flank (outer peripheral curved surface) of the cams of a camshaft.

Another milling cutter for machining the cams of camshafts is disclosed in JP 11138325. This milling cutter not only machines the flank of a cam but also chamfers the edges of the flank. The milling cutter disclosed in this publication also comprises groups of cutting inserts arranged in a circumferentially staggered formation. There are first pairs of cutting inserts that at least partially overlap when superimposed that machine the flank of the cam, as in JP 2000052131. In addition, there are second pairs of cutting inserts, different from the first pairs, located on the rim on the cutter in a circumferentially staggered manner, that chamfer the edges of the flank.

It is an object of the present invention to provide a milling cutter and a cutting insert capable of machining the flank of a cam of a camshaft and also of chamfering the edges of the flank, wherein the milling cutter comprises groups of two radially oriented identical cutting inserts arranged in a circumferentially staggered formation and each cutting insert has eight cutting edges.

SUMMARY OF THE INVENTION

In accordance with the present invention there is provided an indexable cutting insert for use in a milling cutter comprising:

generally square shaped top and bottom surfaces;

four substantially identical side surfaces extending between the top surface and the bottom surface;

two diametrically opposite protuberances extending away from each other in a top or bottom view of the cutting insert, each protuberance having a peripheral side surface comprising an intermediate side surface and two minor side surfaces, the intermediate side surface being located between and merging with the two minor side surfaces, each side surface comprising a major side surface connected to an adjacent minor side surface, adjacent major side surfaces merging at two diametrically opposite corner edges of the cutting insert;

eight identical major cutting edges, comprising four major cutting edges formed at the intersection of the major side surfaces with the top surface and four major cutting edges formed at the intersection of the major side surfaces with the bottom surface; and eight identical minor cutting edges, comprising four minor cutting edges formed at the intersection of the minor minor side surfaces with the top surface and four minor cutting edges formed at the intersection of the minor side surfaces with the bottom surface, each minor cutting edge being connected to an adjacent major cutting edge.

In accordance with a preferred embodiment of the present invention, the minor cutting edges are shorter than the major cutting edges and form therewith an obtuse angle in a top or bottom view of the cutting insert.

Further in accordance with a preferred embodiment of the present invention, each side surface has a varying height dimension.

Preferably, the height dimension has a minimum value in a central region of the side surface.

Further preferably, the height dimension decreases monotonically from a maximum value at an outer region of the side surface to the minimum value at the central region.

Typically, the top and bottom surfaces are provided with a chip groove adjacent and extending longitudinally along the major and minor cutting edges.

Preferably, the top surface is provided with a top abutment surface generally centrally located with respect to the major cutting edges and the bottom surface is provided with a bottom abutment surface generally centrally located with respect to the major cutting edges and generally facing away from the top abutment surface.

In accordance with a preferred embodiment, the top and bottom abutment surfaces are flat and parallel to each other and separated by a given distance.

Further in accordance with a preferred embodiment, the given distance between the top and bottom abutment surfaces is at least equal to the maximum value of the height dimension of the side surfaces.

If desired, the cutting insert is provided with a land extending from the major and minor cutting edges towards the chip groove.

There is also provided in accordance with the present invention, a milling cutter comprising a tool body having the general form of a circular disk and a plurality of identical cutting inserts releasably mounted in insert pockets;

the tool body having two oppositely facing generally circular side faces connected by a peripheral mounting face, an axis of rotation passing through the side faces, the axis of rotation defining a direction of rotation of the milling cutter;

the insert pockets being spaced angularly around the peripheral mounting face;

the cutting inserts comprising:

generally square shaped top and bottom surfaces;

four substantially identical side surfaces extending between the bottom surface and the top surface;

two diametrically opposite protuberances extending away from each other in a top or bottom view of the cutting insert, each protuberance having a peripheral side surface comprising and intermediate side surface and two minor side surfaces, the intermediate side surface being located between and merging with the two minor side surfaces, each side surface comprising a major side surface connected to an adjacent minor side surface, adjacent major side surfaces merging at two diametrically opposite corner edges of the cutting insert;

eight identical major cutting edges, formed at the intersection of the major side surfaces with the top and bottom surfaces; and eight identical minor cutting edges, formed at the intersection of the minor side surfaces with the top and bottom surfaces, each minor cutting edge being connected to an adjacent major cutting edge;

the cutting inserts being arranged in a staggered formation in pairs with one of the top or bottom abutment surfaces of each cutting insert facing in the direction of rotation, a first cutting insert of a given pair of cutting inserts having a radially and axially outermost first protuberance protruding axially at least partially from a first side face of the tool body, a second cutting insert of the given pair of cutting inserts having a radially and axially outermost second protuberance protruding axially at least partially from a second side face of the tool body.

In accordance with a preferred embodiment, the first cutting insert has a first major cutting edge located at a given radial distance from the axis of rotation and the second cutting insert has a second major operative cutting edge located at the same given radial distance.

Generally, the first and second protuberances protrude radially at least partially from the peripheral mounting face.

BRIEF DESCRIPTION OF THE DRAWINGS

For a better understanding the invention will now be described, by way of example only, with reference to the accompanying drawings in which.

DETAILED DESCRIPTION OF PREFERRED EMBODIMENTS

Figure 1:
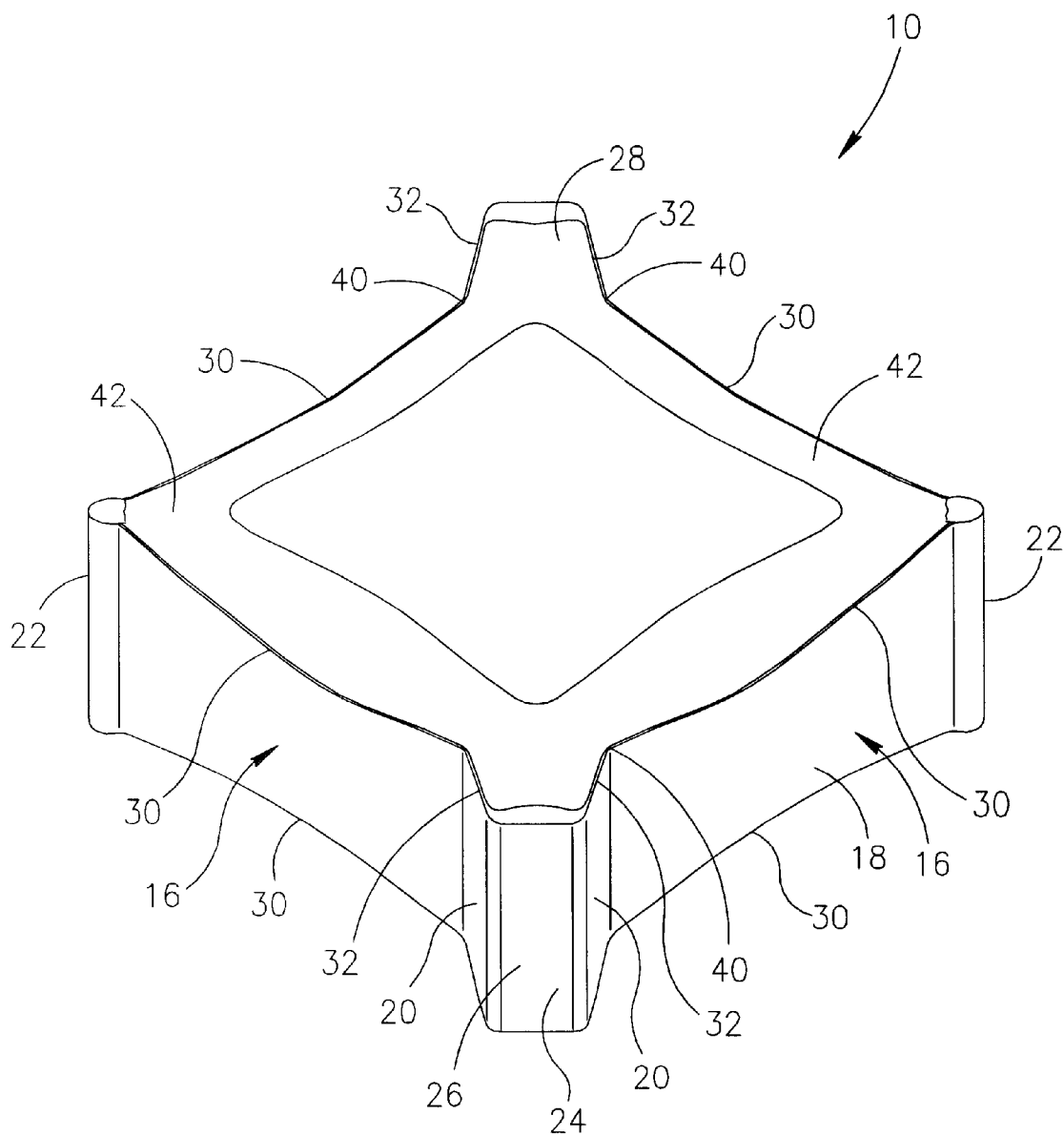
FIG. 1 is a perspective view of the cutting insert in accordance with the present invention.
Figure 2:
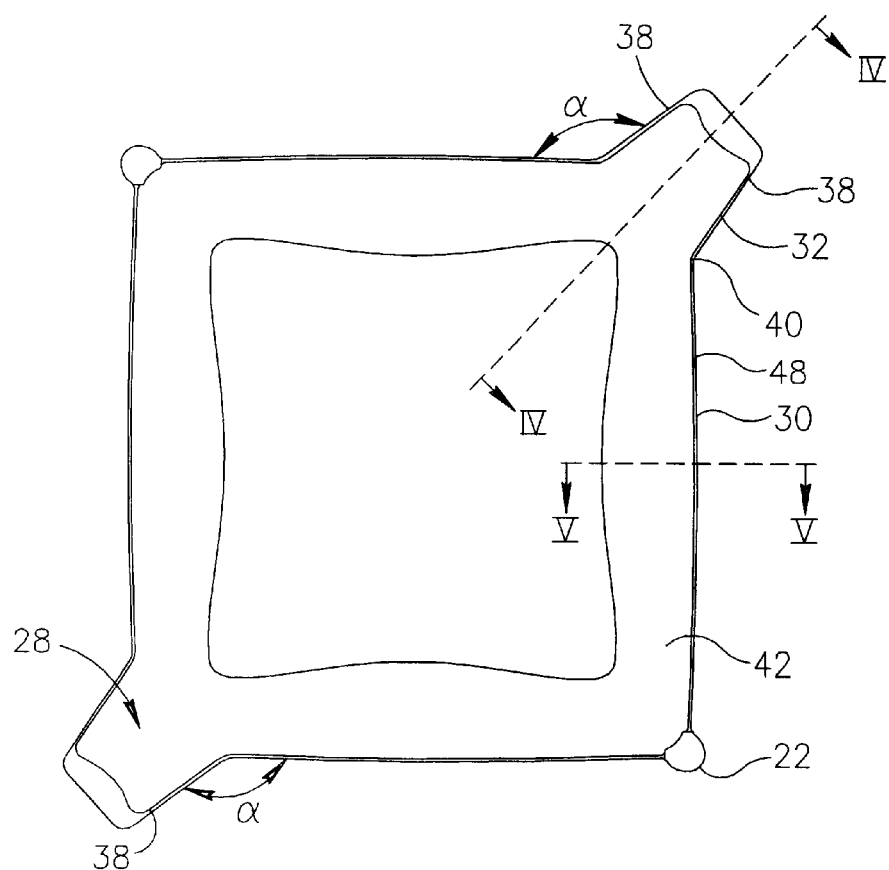
FIG. 2 is a top view of the cutting insert illustrated in FIG. 1.
Figure 3:
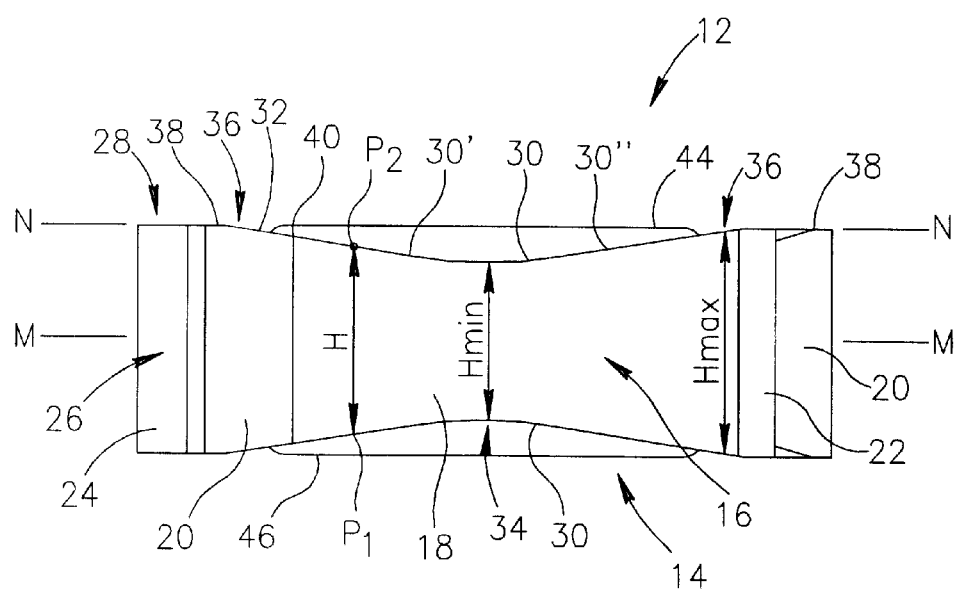
FIG. 3 is a side view of the cutting insert illustrated in FIG. 1.

Attention is first drawn to FIGS. 1 to 3. The cutting insert 10 in accordance with the present invention has generally square shaped top 12 and bottom 14 surfaces. The cutting insert can be manufactured by pressing and sintering or by injection molding. Four substantially identical side surfaces 16 extend between the top surface 12 and the bottom surface 14. The side surfaces 16 are designed to be identical, however, as a result of the manufacturing process one or more of the side surfaces may be slightly different from the required design. For example, it is known that during sintering the cutting insert shrinks and that the shrinkage may be non-uniform. Therefore, substantially identical means herein, as identical as can be achieved taking into consideration manufacturing tolerances. Each side surface 16 comprises a major side surface 18 connected to an adjacent minor side surface 20. Adjacent major side surfaces 18 merge at two diametrically opposite corner edges 22.

Adjacent minor side surfaces 20 merge at an intermediate side surface 24. The two adjacent minor side surfaces 20 and the intermediate side surface 24 form the peripheral side surface 26 of a protuberance 28 protruding outwardly from the cutting insert 10. There are two diametrically opposite protuberances 28 that extend away from each other, in a top or bottom view of the cutting insert 10, as can be seen in FIG. 2.

The intersection of each major side surface 18 with the top 12 or bottom 14 surface defines a major cutting edge 30. There are eight substantially identical major cutting edges 30. The intersection of each minor side surface 20 with the top 12 or bottom 14 surface defines a minor cutting edge 32. There are eight substantially identical minor cutting edges 32. Each minor cutting edge 32 is connected to an adjacent major cutting edge 30. As seen in FIG. 2, in a top or bottom view of the cutting insert, each minor cutting edge and its adjacent major cutting edge are connected at a concave portion of a periphery of the cutting insert. In accordance with a preferred embodiment of the present invention, the minor cutting edges 32 are shorter than the major cutting edges 30 and form therewith an external obtuse angle α in a top or bottom view of the cutting insert 10, as can be seen in FIG. 2.

For each side surface 16 a height dimension H is defined as the vertical height of the side surface in a side view of the cutting insert (see FIG. 3). In other words, the height dimension H is the distance between a first point PI on the major cutting edge 30 associated with the bottom surface 14 and a vertically opposite second point $P_2$ on the major cutting edge 30 associated with the top surface 12. In accordance with a preferred embodiment of the present invention, each side surface 16 has a varying height dimension H. Preferably, the height dimension H has a minimum value $H_{min}$ in a central region 34 of the side surface 16. Further preferably, the height dimension H decreases monotonically from a maximum value $H_{max}$ at an outer region 36 of the side surface 16 to the minimum value $H_{min}$ at the central region 34.

With reference to FIG. 3, two planes are defined. A median plane M located midway between the top and bottom surfaces 12, 14 and a reference plane N parallel to the median plane M and passing through the outer extremities 38 of the minor cutting edges 32 associated with the top surface 12. A similar reference plane associated with the bottom surface 14 could also be defined, however, it is redundant since the cutting insert 10 has mirror symmetry with respect to the median plane M.

Figure 4:
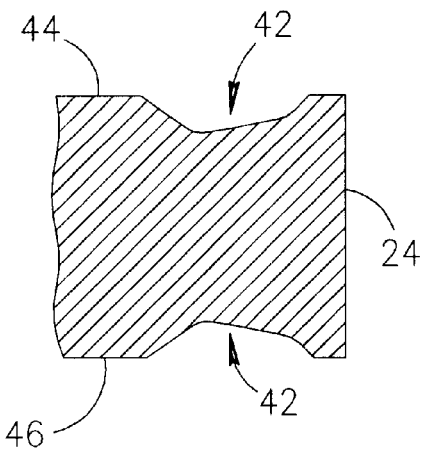
FIG. 4 is a cross section of a portion of the cutting insert along the line IV—IV in FIG. 2.
Figure 5:
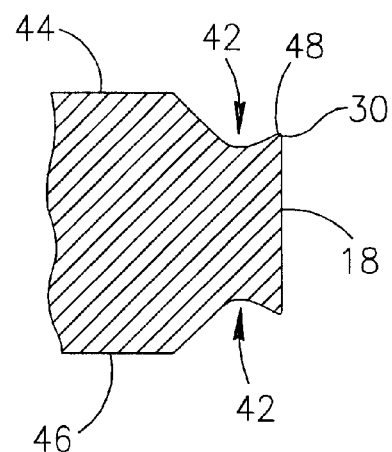
FIG. 5 is a cross section of a portion of the cutting insert along the line V—V in FIG. 2.

For a given side surface 16 the major and minor cutting edges 30, 32 associated with the given side surface have a varying slope that is directly related to the varying height dimension. The minor cutting edge 32 extends from its outer extremity 38 to a point 40 where it merges with the major cutting edge 30 whilst sloping away from the reference plane N and towards the median plane M. The major cutting edge 30 comprises two sections, a first section $30_1$ extends from the point 40, where it merges with the minor cutting edge 32, towards the central region 34 of the side surface 16 whilst sloping away from the reference plane N and towards the median plane M, a second section $30_2$ extends from the central region 34 of the side surface 16 whilst sloping towards the reference plane N and away from the median plane M. Reference is also made to FIGS. 4 and 5 showing a chip groove 42 provided in the top and bottom surfaces 12, 14. The chip groove 42 is adjacent to and extends longitudinally along the major and minor cutting edges 30, 32.

The top surface 12 is provided with a top abutment surface 44 generally centrally located with respect to the major cutting edges 30 and the bottom surface 14 is provided with a bottom abutment surface 46 generally centrally located with respect to the major cutting edges 30 and generally facing away from the top abutment surface 44. In accordance with a preferred embodiment, the top and bottom abutment surfaces 44, 46 are flat and parallel to each other. The distance between the top and bottom abutment surfaces 44, 46 is at least equal to the maximum value $H_{max}$ of the height dimension H of the side surfaces. The cutting insert 10 is provided with a land 48 extending from the major and minor cutting edges 30, 32 towards the chip groove 42.

Figure 6:
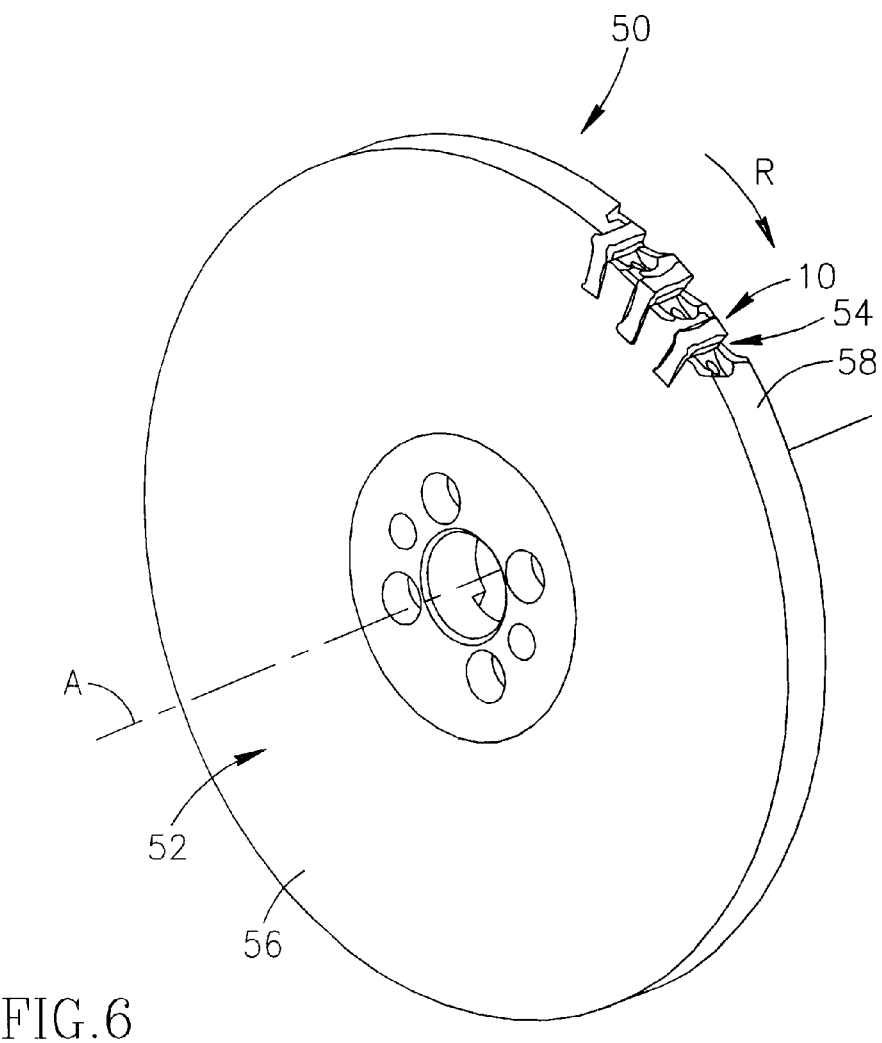
FIG. 6 is a perspective view of a milling cutter in which are seated cutting inserts in accordance with the present invention.
Figure 7:
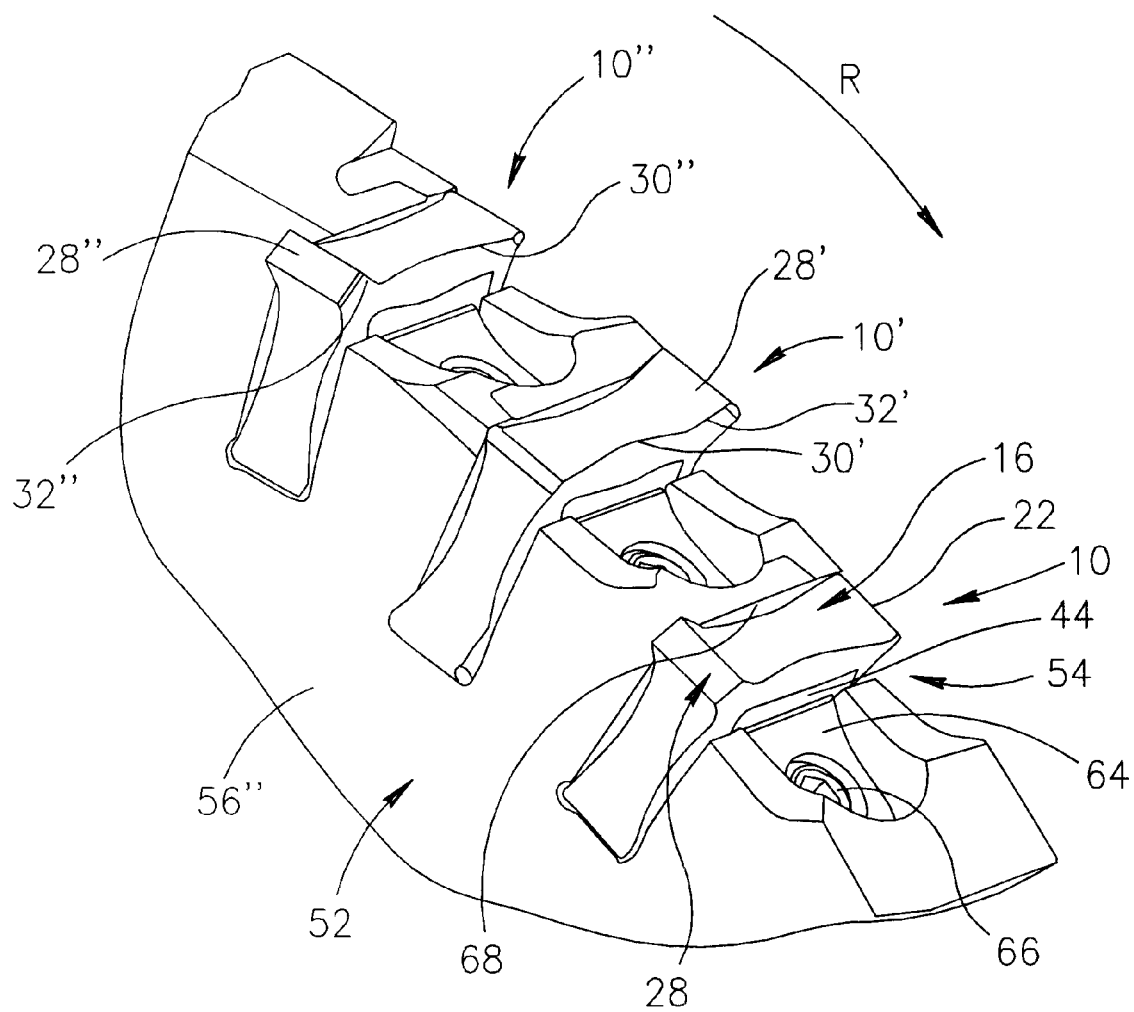
FIG. 7 is a perspective view of a portion of the milling cutter shown in FIG. 5.
Figure 8:
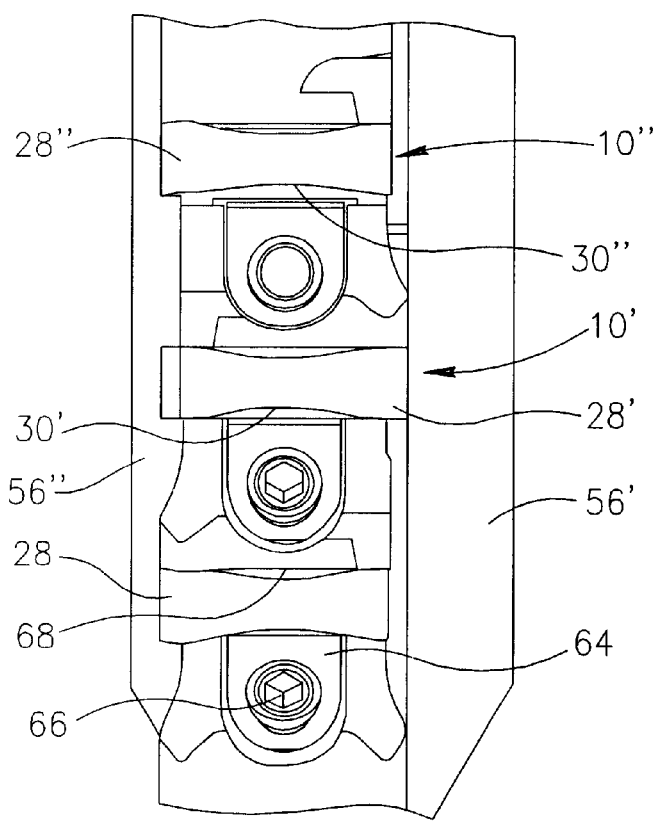
FIG. 8 is a radial end view of a portion of the milling cutter shown in FIG. 5.

Attention is now drawn to FIGS. 6 to 8, showing a milling cutter 50, comprising a tool body 52 having the general form of a circular disk and a plurality of identical cutting inserts 10, in accordance with the present invention, releasably mounted in insert pockets 54. In FIG. 6 only three cutting inserts 10 are shown and the same three cutting inserts are shown in FIGS. 7 and 8. The tool body 52 has two oppositely facing generally circular side faces 56 connected by a peripheral mounting face 58. An axis of rotation A passes through the side faces 56 and defines a direction of rotation R of the milling cutter 50.

The insert pockets 54 are spaced angularly around the peripheral mounting face 58 and the cutting inserts 10 are arranged in a staggered formation in pairs with one of the top or bottom abutment surfaces 44, 46 of each cutting insert 10 facing in the direction of rotation R. A first cutting insert 10' of a given pair of cutting inserts has a radially and axially outermost first protuberance 28' protruding axially at least partially from a first side face 56' of the tool body 52. A second cutting insert 10" of the given pair of cutting inserts has a radially and axially outermost second protuberance 28" protruding axially at least partially from a second side face 56" of the tool body 52. Generally, the first and second protuberances 28', 28" protrude radially at least partially from the peripheral mounting face 58.

Figure 9:
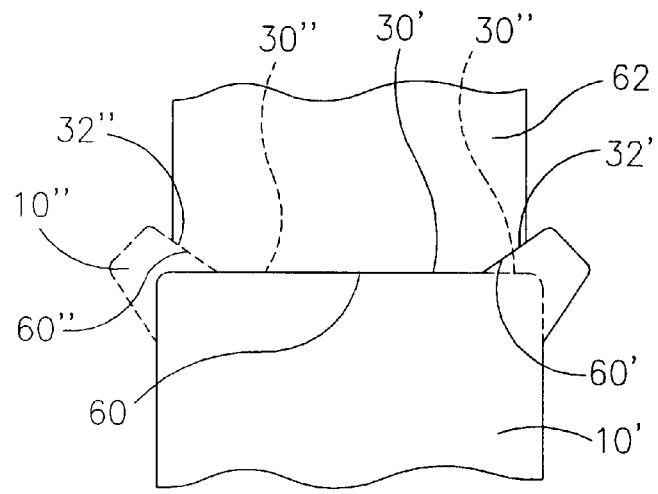
FIG. 9 is a partial view showing how two cutting inserts of the milling cutter shown in FIG. 5 are mutually superimposed to produce the required profile in a workpiece.

Attention is now drawn to FIG. 9 showing how the two cutting inserts 10', 10" of the milling cutter 50 produce a required profile 60, 60', 60" in a workpiece 62. The workpiece being the cam of a camshaft. In the figure the two cutting inserts 10', 10" mutually superimposed with the first cutting insert 10', represented by a solid line, being in front of the second cutting insert 10", which is represented by a dashed line. The required profile in the workpiece comprises a central straight section 60 (the flank of the cam) and two beveled sections 60', 60" (the chamfered edges of the flank) on either side of the central straight section 60. The first beveled section 60' is formed by the first minor cutting edge 32' associated with the first protuberance 28' of the first cutting insert 10', whereas the second beveled section 60" is formed by the second minor cutting edge 32" associated with the second protuberance 28" of the second cutting insert 10". The central straight section 60 is formed by both the first major cutting edge 30' of the first insert 10' and the second major cutting edge 30" of the second insert 10", which, as can be seen overlap. Since, the first major cutting edge 30' of the first insert 10' and the second major cutting edge 30" of the second insert 10" overlap, they are located at the same radial distance from the axis of rotation.

Referring to FIG. 8 it can be seen that the fact that the major cutting edge 30 (30', 30") slopes as described above, introduces an inherent axial rake thereby avoiding the necessity of positioning the top surface 12 of the cutting insert 10 at an angle to the axis of rotation A. Consequently, the angular pitch between adjacent cutting inserts can be reduced giving rise to the well-known advantages of close pitch milling cutters. It will be apparent that a further advantage of the cutting insert in accordance with the teachings of the present invention is the possibility of using the same cutting inserts in milling cutters of different widths. Therefore, by adjusting the axial overlap of the cutting inserts, the length of the central straight section 60 in the workpiece can be altered. Yet a further advantage of the present invention is that the milling cutter uses a single type of cutting insert that can be indexed eight times and that can be used as either a right-hand or left-hand cutting insert when mounted on the milling cutter.

As can be seen in FIGS. 7 and 8, the cutting insert 10 is retained in the insert pocket 54 by means of a wedge 64, which abuts the top abutment surface 44 of the insert 10. The wedge 64 being secured to the tool body 52 of the milling cutter 50 by a screw 66. The insert 10 is wedged between the wedge 64 and a support surface 68 of the insert pocket 54. The support surface 68 faces the direction of rotation R. As can be seen, the bottom surface 14 of the insert 10 abuts the support surface 68 in the region of protrusion 28 and the corner edge 22, thereby supporting the insert 10 against cutting forces when the milling cutter 50 is in operation. As can be seen in FIG. 3, this arrangement is made possible by the fact that both the corner edges 22 and the protrusions have the same height $H_{max}$, and also by the fact that the corner edges 22 are cylindrical in shape, giving them a larger surface area than would be obtained by a corner edge that would be formed merely by the intersection of adjacent major side surfaces 18.

Although the present invention has been described to a certain degree of particularity, it will be appreciated that various modifications can be made without departing from the spirit or scope of the invention as hereinafter claimed.

What is claimed is:

1. An indexable cutting insert for use in a milling cutter comprising:

generally square shaped top and bottom surfaces;

four substantially identical side surfaces extending between the top surface and the bottom surface;

two diametrically opposite protuberances extending away from each other in a top or bottom view of the cutting insert, each protuberance having a peripheral side surface comprising an intermediate side surface and two minor side surfaces, the intermediate side surface being located between and merging with the two minor side surfaces, each side surface comprising a major side surface connected to an adjacent minor side surface, adjacent major side surfaces merging at two diametrically opposite corner edges of the cutting insert;

eight identical major cutting edges, comprising four major cutting edges formed at the intersection of the major side surfaces with the top surface and four major cutting edges formed at the intersection of the major side surfaces with the bottom surface; and eight identical minor cutting edges, comprising four minor cutting edges formed at the intersection of the minor side surfaces with the top surface and four minor cutting edges formed at the intersection of the minor side surfaces with the bottom surface, each minor cutting edge being connected to an adjacent major cutting edge;

wherein each minor cutting edge forms an external obtuse angle (α) with its adjacent major cutting edge, in a top or bottom view of the cutting insert.

2. The cutting insert according to claim 1, wherein the minor cutting edges are shorter than the major cutting edges.

3. The cutting insert according to claim 1, wherein each side surface has a varying height dimension (H).

4. The cutting insert according to claim 3, wherein the height dimension (H) has a minimum value ($H_{min}$) in a central region of the side surface.

5. The cutting insert according to claim 4, wherein the height dimension (H) decreases monotonically from a maximum value ($H_{max}$) at an outer region of the side surface to the minimum value ($H_{min}$) at the central region.

6. The cutting insert according to claim 1, wherein the top and bottom surfaces are provided with a chip groove adjacent and extending longitudinally along the major and minor cutting edges.

7. The cutting insert according to claim 1, wherein the top surface is provided with a top abutment surface generally centrally located with respect to the major cutting edges and the bottom surface is provided with a bottom abutment surface generally centrally located with respect to the major cutting edges and generally facing away from the top abutment surface.

8. The cutting insert according to claim 7, wherein the top and bottom abutment surfaces are flat and parallel to each other and separated by a given distance.

9. The cutting insert according to claim 8, wherein the given distance between the top and bottom abutment surfaces is at least equal to the maximum value ($H_{max}$) of the height dimension (H) of the side surfaces.

10. The cutting insert according to claim 6, wherein the cutting insert is provided with a land extending from the major and minor cutting edges towards the chip groove.

11. A milling cutter comprising a tool body having the general form of a circular disk and a plurality of identical cutting inserts releasably mounted in insert pockets;

the tool body having two oppositely facing generally circular side faces connected by a peripheral mounting face, an axis of rotation (A) passing through the side faces, the axis of rotation (A) defining a direction of rotation (R) of the milling cutter;

the insert pockets being spaced angularly around the peripheral mounting face;

the cutting inserts comprising:

generally square shaped top and bottom surfaces;

four substantially identical side surfaces extending between the top surface and the bottom surface;

two diametrically opposite protuberances extending away from each other in a top or bottom view of the cutting insert, each protuberance having a peripheral side surface comprising and intermediate side surface and two minor side surfaces, the intermediate side surface being located between and merging with the two minor side surfaces, each side surface comprising a major side surface connected to an adjacent minor side surface, adjacent major side surfaces merging at two diametrically opposite corner edges of the cutting insert;

eight identical major cutting edges, formed at the intersection of the major side surfaces with the top and bottom surfaces; and eight identical minor cutting edges, formed at the intersection of the minor side surfaces with the top and bottom surfaces, each minor cutting edge being connected to an adjacent major cutting edge;

wherein each minor cutting edge forms an external obtuse angle (α) with its adjacent major cutting edge, in a top or bottom view of the cutting insert;

the cutting inserts being arranged in a staggered formation in pairs with one of the top or bottom abutment surfaces of each cutting insert facing in the direction of rotation (R), a first cutting insert of a given pair of cutting inserts having a radially and axially outermost first protuberance protruding axially at least partially from a first side face of the tool body, a second cutting insert of the given pair of cutting inserts having a radially and axially outermost second protuberance protruding axially at least partially from a second side face of the tool body.

12. The milling cutter according to claim 11, wherein the first cutting insert has a first major cutting edge located at a given radial distance from the axis of rotation (A) and the second cutting insert has a second major cutting edge located at the same given radial distance.

13. The milling cutter according to claim 12, wherein the first and second protuberances protrude radially at least partially from the peripheral mounting face.

14. An indexable cutting insert for use in a milling cutter comprising:

generally square shaped top and bottom surfaces;

four substantially identical side, surfaces extending between the top surface and the bottom surface;

two diametrically opposite protuberances extending away from each other in a top or bottom view of the cutting insert, each protuberance having a peripheral side surface comprising an intermediate side surface and two minor side surfaces, the intermediate side surface being located between and merging with the two minor side surfaces, each side surface comprising a major side surface connected to an adjacent minor side surface, adjacent major side surfaces merging at two diametrically opposite corner edges of the cutting insert;

eight identical major cutting edges, comprising four major cutting edges formed at the intersection of the major side surfaces with the top surface and four major cutting edges formed at the intersection of the major side surfaces with the bottom surface; and eight identical minor cutting edges, comprising four minor cutting edges formed at the intersection of the minor side surfaces with the top surface and four minor cutting edges formed at the intersection of the minor side surfaces with the bottom surface, each minor cutting edge being connected to an adjacent major cutting edge;

wherein, in a top or bottom view of the cutting insert, each minor cutting edge and its adjacent major cutting edge are connected at a concave portion of a periphery of the cutting insert.

15. An indexable cutting insert for use in a milling cutter comprising:

generally square shaped top and bottom surfaces;

four substantially identical side surfaces extending between the top surface and the bottom surface;

two diametrically opposite protuberances extending away from each other in a top or bottom view of the cutting insert, each protuberance having a peripheral side surface comprising an intermediate side surface and two minor side surfaces, the intermediate side surface being located between and merging with the two minor side surfaces, each side surface comprising a major side surface connected to an adjacent minor side surface, adjacent major side surfaces merging at two diametrically opposite corner edges of the cutting insert;

eight identical major cutting edges, comprising four major cutting edges formed at the intersection of the major side surfaces with the top surface and four major cutting edges formed at the intersection of the major side surfaces with the bottom surface; and eight identical minor cutting edges, comprising four minor cutting edges formed at the intersection of the minor side surfaces with the top surface and four minor cutting edges formed at the intersection of the minor side surfaces with the bottom surface, each minor cutting edge being connected to an adjacent major cutting edge, wherein, in a top or bottom view of the cutting insert, said two diametrically opposite protuberances extend farther outward from a center of the cutting insert than said two diametrically opposite corner edges at which said adjacent major side surfaces merge.

* * * * *